(12) United States Patent
Nagatomi et al.

(10) Patent No.: US 11,230,184 B2
(45) Date of Patent: Jan. 25, 2022

(54) WORK VEHICLE

(71) Applicant: Kubota Corporation, Osaka (JP)

(72) Inventors: Tatsuya Nagatomi, Sakai (JP); Shinya Izumi, Sakai (JP)

(73) Assignee: Kubota Corporation, Osaka (JP)

( * ) Notice: Subject to any disclaimer, the term of this patent is extended or adjusted under 35 U.S.C. 154(b) by 237 days.

(21) Appl. No.: 16/708,840

(22) Filed: Dec. 10, 2019

(65) Prior Publication Data
US 2020/0298695 A1    Sep. 24, 2020

(30) Foreign Application Priority Data

Mar. 20, 2019 (JP) .............................. JP2019-053303
Mar. 26, 2019 (JP) .............................. JP2019-058861

(51) Int. Cl.
*B60K 11/04* (2006.01)
*B60H 1/00* (2006.01)
(Continued)

(52) U.S. Cl.
CPC .......... *B60K 11/04* (2013.01); *B60H 1/00507* (2013.01); *B62D 21/11* (2013.01); *B62D 23/005* (2013.01); *B60Y 2200/20* (2013.01)

(58) Field of Classification Search
CPC ...... B60K 11/04; B60K 11/08; B62D 23/005; B62D 21/11; B60H 1/00507; B60Y 2200/20; F02M 35/10006
See application file for complete search history.

(56) References Cited

U.S. PATENT DOCUMENTS 4,237,996 A  * 12/1980  Matsuda ................ B62K 11/04
                                                     180/229
2007/0175824 A1 *  8/2007  Togawa ........... B60K 15/03177
                                                     210/618

(Continued)

FOREIGN PATENT DOCUMENTS

FR      2687615 A1 * 8/1993 ................ B60F 5/00
JP      200967082 A     4/2009
JP      201012998 A     1/2010

*Primary Examiner* — Darlene P Condra
(74) *Attorney, Agent, or Firm* — The Webb Law Firm

(57) ABSTRACT

In a work vehicle including a pair of left and right link mechanisms disposed between a vehicle body and a wheel support member and configured to support the wheel support member to the vehicle body to be vertically pivotable, a suspension mechanism disposed between the vehicle body and the wheel support member and configured to elastically support the wheel support member, and an engine disposed between the pair of left and right link mechanisms, each one of the pair of left and right link mechanisms including an upper link provided between a link support portion formed in the vehicle body and the wheel support member and a lower link provided between the link support portion and the wheel support member, there are provided a radiator disposed on lateral outer side of the vehicle body relative to the link mechanisms, a cooling water circulation hose connected to the engine and the radiator and configured to circulate engine cooling water between the engine and the radiator. The link support portion has a recess portion opened to the space between the upper link and the lower link. And, the cooling water circulation hose is provided to enter the recess portion to extend through the space in a vehicle body inner/outer direction.

5 Claims, 14 Drawing Sheets

(51) Int. Cl.
*B62D 21/11* (2006.01)
*B62D 23/00* (2006.01)

(56) References Cited

U.S. PATENT DOCUMENTS

2012/0216984 A1* 8/2012 Yamanishi ............. B60K 11/04
   165/44
2018/0093734 A1* 4/2018 Matsuo .................. B62K 11/04

* cited by examiner

WORK VEHICLE

CROSS-REFERENCE TO RELATED APPLICATIONS

This application claims priority to Japanese Patent Application Nos. 2019-053303 and 2019-058861 filed Mar. 20, 2019 and Mar. 26, 2019, respectively, the disclosures of which are hereby incorporated by reference in their entirety.

FIELD OF THE INVENTION

The present invention relates to a work vehicle.

Further, the present invention relates to a work vehicle in which a radiator for carrying out cooling of cooling air through heat exchange with ambient air and a cooling fan disposed adjacent a side opposite to an air intake face of the radiator are accommodated inside a common accommodation space.

BACKGROUND ART

Background Art 1

As a work vehicle, there is known a work vehicle including a pair of left and right link mechanisms disposed between a vehicle body and a wheel support member and configured to support the wheel support member to the vehicle body to be vertically pivotable, a suspension mechanism disposed between the vehicle body and the wheel support member and configured to elastically support the wheel support member, and an engine disposed between the pair of left and right link mechanisms, each one of the pair of left and right link mechanisms including an upper link provided between a link support portion formed in the vehicle body and the wheel support member, and a lower link provided between the link support portion and the wheel support member.

As an example of a work vehicle of the above-noted type, there is known e.g. a multi-purpose work vehicle disclosed in Japanese Unexamined Patent Application No. 2009-67082 (JP2009-67082A). The multi-purpose work vehicle disclosed in this No. 2009-67082 document includes an upper arm as the "upper link", a lower am as the "lower link", and a coil spring as the "suspension mechanism".

Background Art 2

In the work vehicle of the above-noted type in which a radiator for carrying out cooling of cooling air through heat exchange with ambient air and a cooling fan disposed adjacent a side opposite to an air intake face of the radiator are accommodated inside a common accommodation space, there is provided a partition member for partitioning spaces present before and after the radiator inside the accommodation space to an upstream side and a downstream side with respect to air communication direction. In an outer circumferential portion of this partition member, there is attached a trim for providing tight seal between the periphery of the partition member and the inside space of the accommodation space (Japanese Unexamined Patent Application No. 2010-12998 publication document (JP2010-12998A) (see paragraphs [0016] through [0018], FIGS. 3-5)).

SUMMARY OF THE INVENTION

Problems to be Solved by Invention

Problem 1

A problem relating to [Background Art 1] is as follows.

In the above-described work vehicle, in case the radiator is provided between the pair of left and right link mechanisms in an attempt to make short the length of a cooling water circulation hose for circulating engine cooling water between the engine and the radiator, maintenance operations such as cleaning, inspection etc. of the radiator are difficult, since this radiator is located at a far depth position into the vehicle body.

The present invention provides a work vehicle that allows a maintenance operation of the radiator to be carried out easily, while keeping the length of the cooling water circulation hose short.

Problem 2

A problem relating to [Background Art 2] is as follows.

According to the conventional technique disclosed in the above-identified patent document, the technique is useful in that spaces present before and after the radiator inside the accommodation space can be partitioned in a favorable manner.

However, with this arrangement, it is necessary to employ a partition member dedicated to attachment of the trim. And, in the case of a maintenance work or the like, there is needed a troublesome work for attachment/detachment of this partition member to/from the support member or a dustproof mesh, etc. In this respect, there remains room for improvement.

The present invention intends to simplify the arrangement of partitioning spaces before and after a radiator inside the accommodation space with use of a trim and to simplify also a maintenance work at the trim attached portion.

Solutions

Solution addressing to [Problem 1] is as follows.

A work vehicle according to the present invention comprises:

a pair of left and right link mechanisms disposed between a vehicle body and a wheel support member and configured to support the wheel support member to the vehicle body to be vertically pivotable;

a suspension mechanism disposed between the vehicle body and the wheel support member and configured to elastically support the wheel support member;

an engine disposed between the pair of left and right link mechanisms;

each one of the pair of left and right link mechanisms including an upper link provided between a link support portion formed in the vehicle body and the wheel support member and a lower link provided between the link support portion and the wheel support member;

a radiator disposed on lateral outer side of the vehicle body relative to the link mechanisms;

a cooling water circulation hose connected to the engine and the radiator and configured to circulate engine cooling water between the engine and the radiator;

the link support portion having a recess portion opened to the space between the upper link and the lower link; and the cooling water circulation hose being provided to enter the recess portion to extend through the space in a vehicle body inner/outer direction.

With the above-described inventive arrangement, since the radiator is positioned on more vehicle body lateral outer side than the link mechanisms, the radiator is readily accessible from the vehicle body lateral outer side when a maintenance work of the radiator is to be carried out.

Of the space formed between the upper link and the lower link where the cooling water circulation hose can be disposed to circumvent the upper link and the lower link with advantageous reduction in the length of this cooling water circulation hose, the cooling water circulation hose is extended through a portion thereof where the lifting displacement between the upper link and the lower link is minimal. Thus, a maintenance work of the radiator can be carried out easily with advantageous reduction of the length of the cooling water circulation hose.

In the present invention, preferably, of the cooling water circulation hose, a hose portion thereof used for feeding cooling water from the radiator to the engine enters the recess portion to extend through the space in the vehicle body inner/outer direction.

With the above-described inventive arrangement, a discharging portion of the radiator to which the hose portion for feeding cooling water to the engine can be formed at a position beneath the radiator and at a height not much different from the height of the position of the recess portion of the link support portion. Therefore, the length of the hose portion can be made short.

In the present invention, preferably, the radiator is provided on a lateral side of the link support portion.

With the above-described inventive arrangement, it is possible to reduce the spacing between the discharging portion of the radiator where the hose portion feeding cooling water to the engine is connected and the recess portion of the link support portion, so the length of the hose portion can be made short.

In the present invention, preferably, the engine is supported to the wheel support member.

With the above-described inventive arrangement, the engine is lifted up/down, following the link mechanisms. Therefore, in comparison with an arrangement of the engine not being lifted up/down, even if the length of the cooling water circulation hose is shortened, it is still possible to avoid abutment of the cooling water circulation hose to/against the upper link or the lower link. Thus, the length of the cooling water circulation hose can be made short.

In the present invention, preferably, under an empty condition of the vehicle body, a pivot of the lower link relative to the wheel support member is located more downward than a pivot of the lower link relative to the link support portion.

With the above-described inventive arrangement, it is readily possible to secure an appropriate minimal ground clearance for the vehicle body, so the ground clearance of the radiator can be readily increased.

Solution addressing to [Problem 2] is as follows.

A work vehicle according to the present invention comprises:

a radiator for carrying out cooling of cooling water through heat exchange with ambient air;

a cooling fan adjacent a face of the radiator opposite an air intake face thereof;

a dustproof mesh attachable to oppose the front face of the air intake face;

the radiator, the cooling fan and the dustproof mesh being accommodated in a common accommodation space; and a trim for restricting air communication in the accommodation space upwardly of the radiator being attached to an upper side portion of the dustproof mesh.

With the above-described inventive configuration, the dustproof mesh per se can be used as an "attaching means" for the trim. So, the configuration does not separately require any partition member dedicated to the attachment of the trim. Thus, the configuration can be simplified in this respect.

Further, at the time of a maintenance work, in association with detachment of the dustproof mesh, the trim too will be necessarily detached from the periphery of the radiator. So, in comparison with a case of detaching the trim and the dustproof mesh separately, the maintenance work per se can be made simple.

In the present invention, preferably, the length of the trim in the direction along the upper side portion of the dustproof mesh is set substantially equal to the length of the dustproof mesh in this same direction.

With the above-described inventive arrangement, by using the trim at an upper portion of the accommodation space where the temperature tends to be highest inside the accommodation space, air communication inside the accommodation space can be restricted in a reliable manner.

And, since the length of the trim is set to be substantially equal to the length of the dustproof mesh in the same direction, an air communication restriction arrangement at the upper side portion of the dustproof mesh can be readily constituted of a simple arrangement without interfering with attachment/detachment operations of the dustproof mesh. Namely, if the length of the trim were shorter than the upper side portion of the dustproof mesh, it would become necessary to seal a part of the upper side portion of the dustproof mesh where the trim is absent, by a separate shielding structure, thus presenting additional trouble of attaching/detaching such separate shielding structure. Conversely, if the length of the trim were longer than the upper side portion of the dustproof mesh, the excess length portion thereof would extend to the lateral side portion downwardly of the upper side portion of the dustproof mesh, thus presenting a trouble of interfering with the attachment/detachment operation of the dustproof mesh disadvantageously. Then, by setting the length of the trim substantially equal to the length of the dustproof mesh in the same direction, such inconveniences as above can be easily avoided.

In the present invention, preferably, there is provided a fixation frame for supporting the lateral outer end portion in the outer circumferential portion of the radiator under an erect posture, and in the fixation frame, there is formed a guide rail portion for guiding a sliding movement of the lateral side portion of the dustproof mesh in the vertical direction.

With the above-described inventive arrangement, a guide rail portion is formed in the fixation frame which supports the lateral outer end portion in the outer circumferential portion of the radiator under an erect portion. Thus, the fixation frame for supporting the radiator functions for supporting the dustproof mesh and functions also as a guiding means for guiding attachment/detachment of the dustproof mesh.

In the present invention, preferably, the trim is formed like a hollow cylinder whose longitudinal direction is aligned with the upper end portion of the dustproof mesh and the trim is capable of gripping the dust proof mesh from the upper side thereof.

With the above-described inventive arrangement, since the trim is formed like a hollow cylinder whose longitudinal direction is aligned with the upper end portion of the dustproof mesh, this trim can be readily used as a handle member for use at the time of attachment/detachment operation of the dustproof mesh.

EMBODIMENTS

First Embodiment

Next, a first embodiment as an example of the present invention will be explained with reference to the accompanying drawings.

Figure 1:
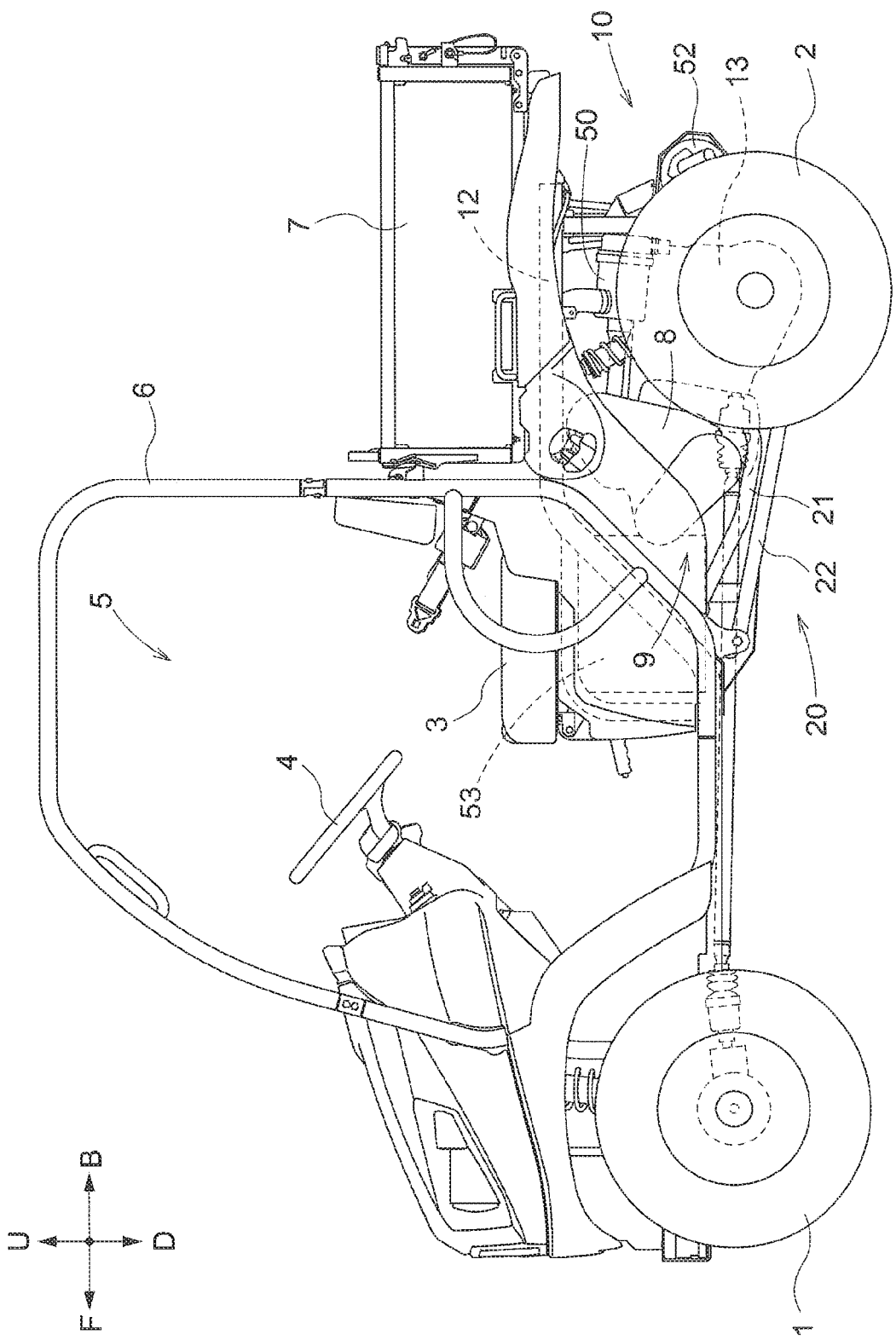
FIG. 1 is a view showing a first embodiment (same is true with the drawings up to FIG. 6), which is a left side view showing a multi-purpose work vehicle in its entirety.

Incidentally, in the following explanation, with respect to a traveling vehicle body of a multi-purpose work vehicle, the direction denoted with an arrow F in FIG. 1 is defined as the "vehicle body front side", the direction denoted with an arrow B is defined as the "vehicle body rear side", the direction denoted with an arrow U is defined as the "vehicle body upper side", the direction denoted with an arrow D is defined as the "vehicle body lower side". The direction on the near (front) side of the illustration of FIG. 1 is defined as the "vehicle body left side" and the direction on the far (back) side of the illustration of FIG. 1 is defined as the "vehicle body right side", respectively.

General Configuration of Multi-Purpose Work Vehicle

As shown in FIG. 1, a multi-purpose work vehicle includes a traveling vehicle body which mounts a pair of left and right front wheels 1 that are steerable and drivable and a pair of left and right rear wheels 2 that are drivable. At a front portion of the traveling vehicle body, there is formed a driving section 5 having a driver's seat 3 and a steering wheel 4 for steering the front wheels 1. In the driving section 5, there is provided a ROPS 6 which covers the riding space. At a rear portion of the traveling vehicle body, there is provided a load carrying deck 7. Under the load carrying deck 7, there is provided a prime mover section 9 having an engine 8.

Arrangement of Suspension Device for Rear Wheel

Figure 2:
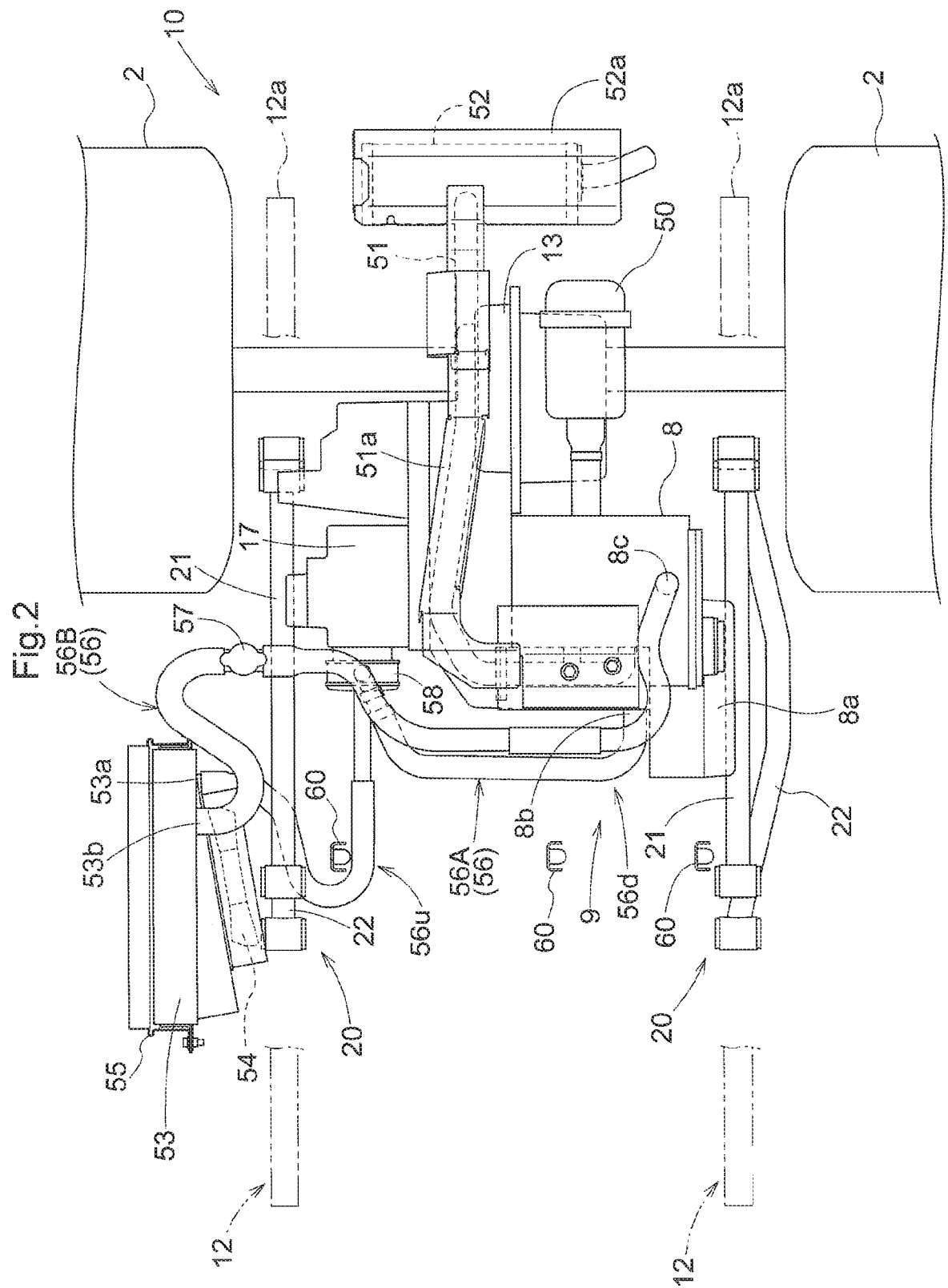
FIG. 2 is a plan view showing a suspension device for a rear wheel and a prime mover section.
Figure 3:
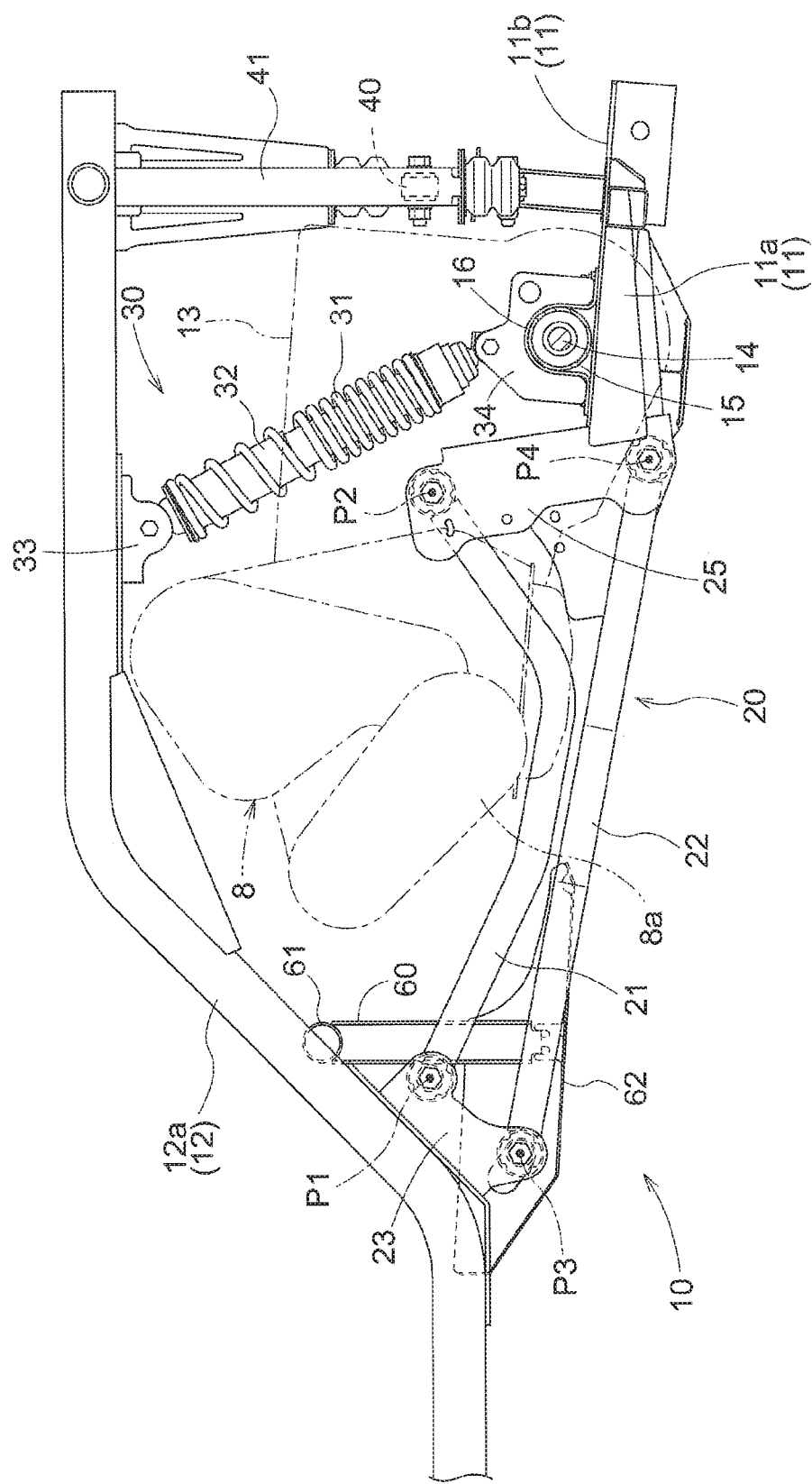
FIG. 3 is a left side view showing the suspension device for the rear wheels.
Figure 4:
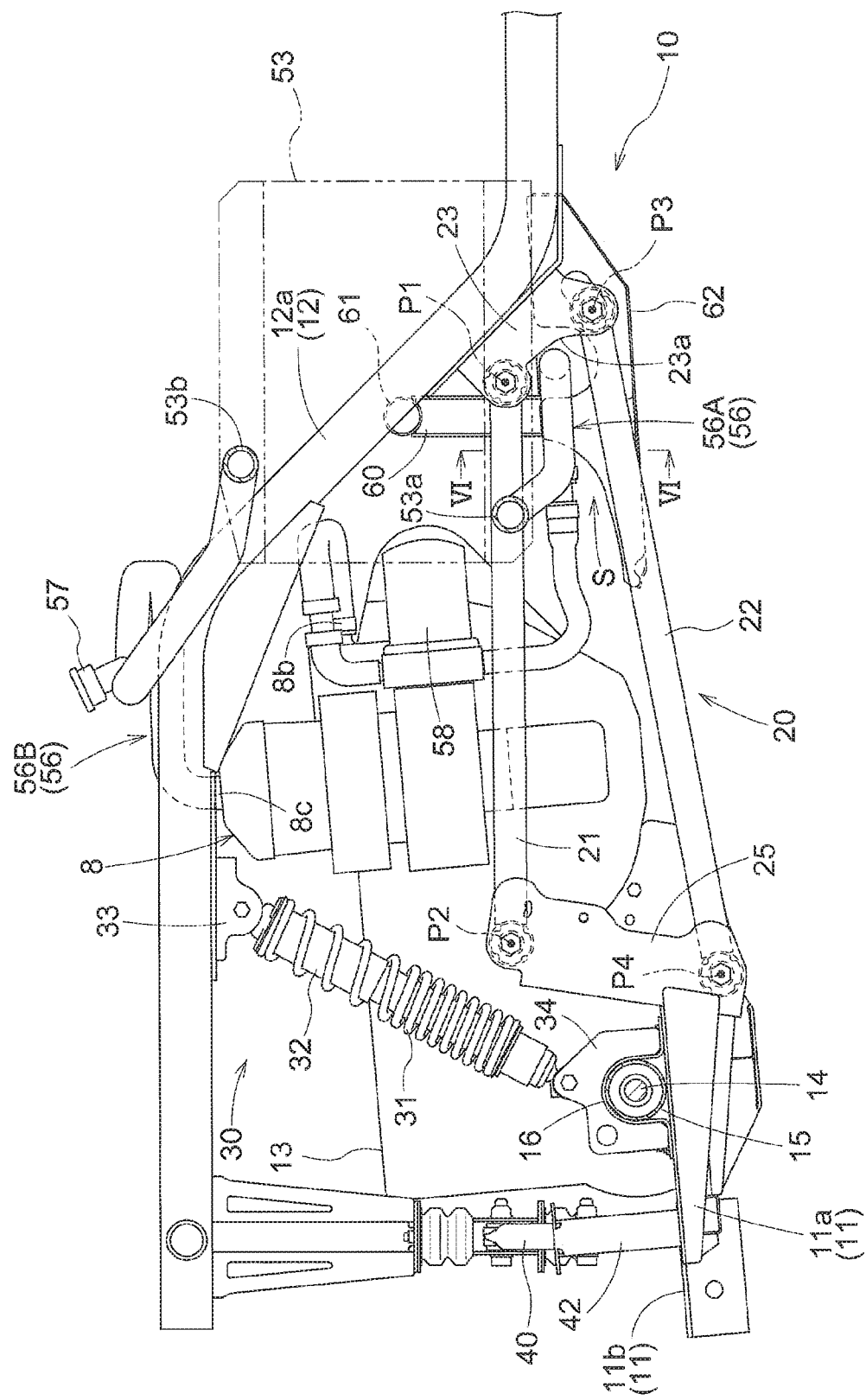
FIG. 4 is a right side view showing the suspension device for the rear wheels.
Figure 5:
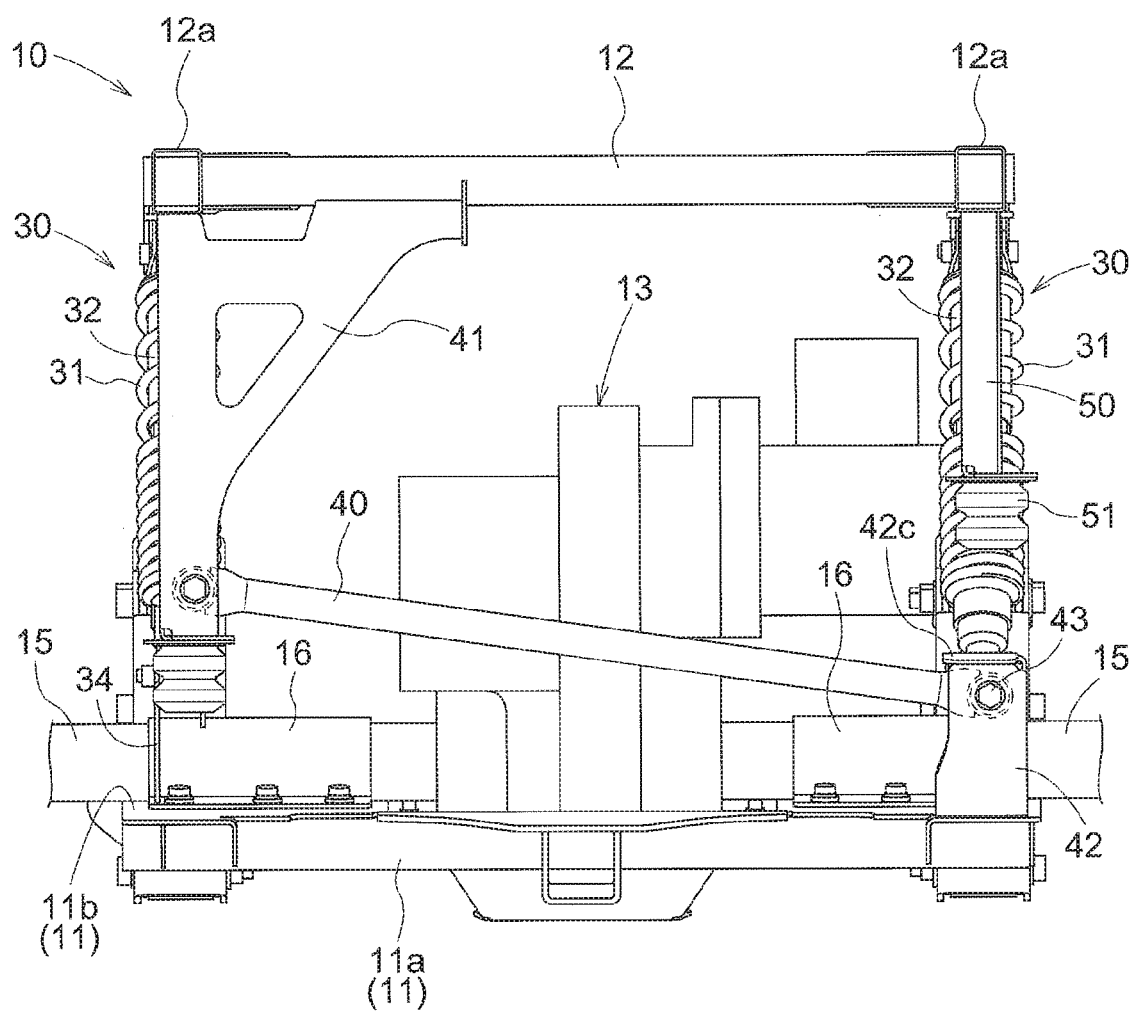
FIG. 5 is a rear view showing the suspension device for the rear wheels.

FIG. 2 is a plan view showing a suspension device 10 for the rear wheels 2, FIG. 3 is a left side view showing the suspension device 10 for the rear wheels 2. FIG. 4 is a right side view showing the suspension device 10 for the rear wheels 2. FIG. 5 is a rear view showing the suspension device 10 for the rear wheels 2.

The suspension device 10 for the rear wheels 2, as shown in FIGS. 2 through 5, includes a wheel support member 11 for supporting the pair of left and right rear wheels 2, a pair of left and right link mechanisms 20 configured to allow lifting up/down of the rear wheels 2 relative to a vehicle body frame 12 by liftably supporting the wheel support member 11 to the vehicle body frame 12 included in a traveling vehicle body, a suspension mechanism 30 for allowing elastic support of the left and right rear wheels 2 by elastically supporting the wheel support member 11, and a lateral link 40 configured to restrict a left/right movement of the wheel support member 11.

The wheel support member 11, as shown in FIGS. 3, 4 and 5, includes a support frame portion 11a and a mount platform portion 11b provided at an upper portion of the support frame portion 11a. A traveling transmission 13 which inputs power of the engine 8 is supported at a lateral center portion of the wheel support member 11. The engine 8 is connected to the traveling transmission 13 and is supported via this traveling transmission 13 to the wheel support member 11.

As shown in FIGS. 3, 4 and 5, a left rear axle 14 extends under a left lateral orientation from the traveling transmission 13. A right rear axle 14 extends under a right lateral orientation from the traveling transmission 13. A left rear axle case 15 that rotatably supports the left rear axle 14 and a right rear axle case 15 that rotatably supports the right rear axle 14 are mounted in distribution on the left side portion and the right side portion of the mount platform portion 11b, respectively. The left and right rear axle cases 15 are fixed to the mount platform portion 11b via a case holder 16 which is fixed with connecting bolts to the mount platform portion 11b as being wound around the outer circumferential portions of the rear axle cases 15. The left and right rear wheels 2 are supported to the wheel support member 11 via the rear axles 14 and the traveling transmission 13. Namely, the left and right rear wheels 2 are supported to the wheel support member 11, under a state of no relative positional displacement occurring between the left and right rear wheels 2. In the instant embodiment, the engine 8 and the traveling transmission 13 are supported, together with the rear wheels 2, to the wheel support member 11. However, the invention is not limited thereto. For instance, the traveling transmission 13 may be supported, together with the left and right rear wheels 2, to the wheel support member 11, with the engine 8 being not supported to the wheel support member 11. Further alternatively, the left and right rear wheels 2 alone may be supported to the wheel support member 11, with the engine 8 and the traveling transmission 13 being not supported to the wheel support member 11.

The left and right link mechanisms 20, as shown in FIGS. 2, 3 and 4, each includes an upper link 21 and a lower link 22 both extending in the vehicle body front/rear direction.

The front end portion of the upper link 21 is supported to a vehicle body side link support portion 23 formed in the vehicle body frame 12 to be pivotable about an upper pivot axis P1 extending in the vehicle body lateral (transverse) width direction. The rear end portion of the upper link 21 is supported to a wheel side link connection portion 25 formed at a lateral end portion of the wheel support member 11 to be pivotable about an upper connection axis P2 extending in the vehicle body lateral width direction. The front end portion of the lower link 22 is supported to a portion of the link support portion 23 which portion is located downwardly of the portion to which the upper link 21 is connected to be pivotable about a lower pivot axis P3 extending in the vehicle body lateral width direction. The rear end portion of the lower link 22 is supported to a portion of the link connection portion 25 which portion is located downwardly of the portion to which the upper link 21 is connected to be pivotable about a lower connection axis P4 extending in the vehicle body lateral width direction.

In the left link mechanism 20, the link support portion 23 is formed at a front/rear intermediate portion of a left main frame 12a included in the vehicle body frame 12, and the link connection portion 25 is formed at the left end portion of the wheel support member 11. In the right link mechanism 20, the link support portion 23 is formed at a front/rear intermediate portion of a right main frame 12a included in the vehicle body frame 12, and the link connection portion 25 is formed at the right end portion of the wheel support member 11.

In the right link mechanism 20, as shown in FIGS. 2 and 4, the upper link 21 and the lower link 22 are formed straight. In the left link mechanism 20, as shown in FIGS. 2 and 3, the upper link 21 has its intermediate portion curved to be located downwardly of its front portion and its rear portion, in order to downwardly circumvent an alternator cover 8a provided at a lateral side portion of the engine 8. The lower link 22 has its intermediate portion curved to bulge to the lateral outer side in order to be lifted up/down with circumventing the intermediate portion of the upper link 21 on the lateral outer side. In the instant embodiment, there has been disclosed an example in which the left upper link 21 and the left lower link 22 are curved. However, these may be formed straight in case there is no need to avoid contact with any device portion.

In the left and right link mechanisms 20, as shown in FIGS. 3 and 4, the distance between the upper pivot axis P1 and the upper connection axis P2 is set shorter than the distance between the lower pivot axis P3 and the lower connection axis P4. And, the distance between the upper pivot axis P1 and the lower pivot axis P3 is set shorter than the distance between the upper connection axis P2 and the lower connection axis P4. Namely, the respective link mechanism 20 is configured such that under an empty state of the vehicle body, namely, in the case of absence of any riding person at the driving section 5 and absence of any load on the load carrying deck 7, as shown in FIGS. 3 and 4, the pivot axis (the lower pivot axis P4) of the lower link 22 relative to the wheel support member 11 may be located downwardly of the pivot axis (the lower pivot axis P3) of the lower link 22 relative to the link support portion 23. With this arrangement, it becomes easier to secure a minimal ground clearance for the vehicle body and also to secure a sufficient ramp angle.

The suspension mechanism 30, as shown in FIGS. 3, 4 and 5, includes a pair of left and right suspension springs 31 and a pair of left and right dumpers 32.

As shown in FIGS. 3 and 4, the left and right dumpers 32 each is connected to a vehicle body side suspension support portion 33 formed in the main frame 12a and a wheel side suspension support portion 34 formed in the case holder 16, thus being provided in the wheel support member 11. In operation, in association with lifting up/down of the wheel support member 11, the dumper 32 is expanded or contracted. The left and right suspension springs 31 are engaged on the dumpers 32 in distribution to the left and right dumpers 32. The upper end portion of the suspension spring 31 is received and supported by a spring retention portion formed at the upper end portion of the dumper 32 and the lower end portion of the suspension spring 31 is received and supported by a spring retention portion formed at the lower end portion of the dumper 32, thus being supported to the wheel support member 11 via the lower side portion of the dumper 32. The left and right suspension springs 31 are expanded/contracted in association with expansion/contraction of the dumpers 32.

The lateral link 40, as shown in FIG. 5, is connected to a vehicle body side support portion 41 extending downwards from the rear end portion of the left main frame 12a and a wheel side support portion 42 protruding upwards from the lateral end portion of the wheel support member 11.

Arrangement of Prime Mover Section

The prime mover section 9, as shown in FIG. 2, includes the engine 8 disposed between the left link mechanism 20 and the right link mechanism 20, a hydrostatic stepless speed changer device 17 configured to input power of the engine 8 and to convert the inputted power into a forward driving power and a reverse driving power, and the traveling transmission 13 configured to input the forward driving power and the reverse driving power outputted from the stepless speed changer device 17 and to output the inputted forward driving power and the reverse driving power to the front wheels 1 and the rear wheels 2. The engine 8 is supported to the wheel support member 11 via the traveling transmission 13 and is lifted up/down relative to the vehicle body frame 12 together with the wheel support member 11.

As shown in FIG. 2, an air cleaner 50 is connected to an air inlet portion formed at a rear portion of the engine 8. As this air cleaner 50 is supported to the engine 8, the air cleaner 50 is lifted up/down together with the engine 8 when this engine 8 is lifted up/down relative to the vehicle body frame 12. To an exhaust portion of the engine 8, there is connected an exhaust muffler 52 via an exhaust pipe 51. The exhaust muffler 52 is supported to a support member (not shown) protruding upwards from the rear end portion of the wheel support member 11, so that when the engine 8 is lifted up/down relative to the vehicle body frame 12, the muffler 52 is lifted up/down together with the engine 8. The exhaust pipe 51 is covered from its upper side by a cover 51a. The exhaust muffler 52 is covered from its upper side by a cover 52a.

Cooling Arrangement of Engine

As shown in FIG. 2, at a portion located on the lateral outer side relative to the right link mechanism 20, there are provided a radiator 53 for the engine and a radiator fan 54. Specifically, the radiator 53 is provided on the lateral side of the link support portion 23 formed in the right main frame 12a. A radiator frame 55 in which the radiator 53 is fitted is supported to a support arm (not shown) extending from the right main frame 12a. The radiator 53 is supported to the vehicle body frame 12 via the radiator frame 55 and the support arm. A cooling water circulation hose 56 is connected to the engine 8 and the radiator 53. In operation, engine cooling water is circulated between the engine 8 and the radiator 53 via the cooling water circulation hose 56 and a circulation pump (not shown), whereby the engine 8 is cooled.

The cooling water circulation hose 56, as shown in FIGS. 2 and 4, includes a feeding side hose portion 56A connected to a discharge portion 53a formed at a lower portion of the radiator 53 and an inlet portion 8b formed in the engine 8 and a returning side hose portion 56B connected to a discharge portion 8c of the engine 8 and an inlet portion 53b formed at an upper portion of the radiator 53.

In this cooling water circulation hose 56 in operation, cooling water cooled by the radiator 53 is fed via the feeding side hose portion 56A and via the radiator 53 to the engine 8. Cooling water which has cooled the engine 8 is returned via the returning side hose portion 56B from the engine 8 to the radiator 53.

The returning side hose portion 56B, as shown in FIGS. 2 and 4, is extended forwards from the discharge portion 8c of the engine 8 to a forward upper portion of the engine 8, and then extended forwards from this forward upper portion to be connected to the inlet portion 53b of the radiator 53. At an intermediate portion of the returning side hose portion 56B, there is formed a replenishment opening 57 for replenishing cooling water to the radiator 53.

The feeding side hose portion 56A, as shown in FIGS. 2 and 4, includes an upstream side portion 56u connected to the discharge portion 53a of the radiator 53 and an inlet of a water cooling section included in an oil cooler 58, and a downstream side portion 56d connected to a discharge portion of the water cooling section of the oil cooler 58 and the inlet portion 8b formed at a front portion of the engine 8. The upstream side portion 56u is extended under a left obliquely forward orientation from the discharge portion 53a of the radiator 53 through a space S formed between the upper link 21 and the lower link 22 of the right link mechanism 20 to a position forwardly of a support arm 60 oriented along the vehicle body vertical direction and provided at a position located at a vehicle body inner side relative to the right link mechanism 20 and then extended from this forward portion through the lateral side of the support arm 60 to be connected eventually to the inlet portion of the water cooling section of the oil cooler 58. The downstream side portion 56d is extended under left lateral orientation from the discharge portion of the water cooling section of the oil cooler 58 to be connected to the inlet portion 8b of the engine 8. The oil cooler 58 is provided at a front portion of the stepless speed changer device 17. In this oil cooler 58, working oil of the stepless speed changer device 17 is supplied and through heat exchange between the supplied working oil and the cooling water supplied from the radiator 53 via the upstream side portion 56u, cooling of the working oil is carried out. In the oil cooler 58, the engine cooling water is utilized for cooling of the working oil. The support arm 60, as shown in FIG. 4, is extended downwards from a lateral frame 61 connected to the left main frame 12a and supports, at its lower portion, an under guard 62. The under guard 62 is provided between the front portions of the left and right link mechanisms 20 and covers the downstream side portion 56d from its under side.

Figure 6:
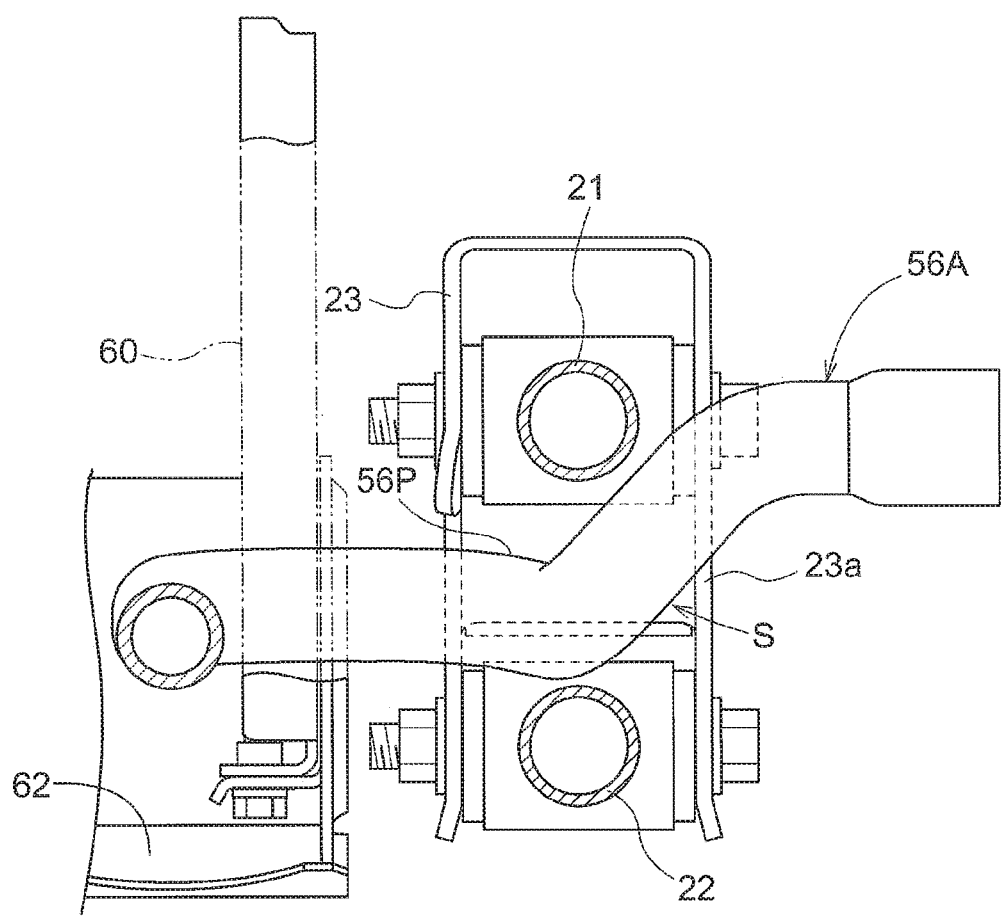
FIG. 6 is a section view taken along VI-VI line in FIG. 4.

As shown in FIGS. 4 and 6, in the link support portion 23 supporting the upper link 21 and the lower link 22 of the right link mechanism 20, there is provided a recess portion 23a which is opened to a space S formed between the upper link 21 and the lower link 22 of the right link mechanism 20. In the feeding side hose portion 56A, a portion 56P thereof extending through the space S passes this space S as entering the recess portion 23a. Namely, the feeding side hose portion 56A passes through a portion of the space S where the lifting displacement of the upper link 21 and the lower link 22 is small.

Modified Embodiments of First Embodiment (1) In the foregoing embodiment, there was disclosed an example in which the radiator 53 is provided at a position located on the vehicle body lateral outer side relative to the right link mechanism 20. However, the radiator 53 may be provided at a position located on the vehicle body lateral outer side relative to the left link mechanism 20.

(2) In the foregoing embodiment, there was disclosed an example in which the radiator 53 is disposed on a lateral side of the link support portion 23. However, the invention is not limited thereto. For instance, the radiator 53 may be provided at a position forwardly of or rearwardly of the link support portion 23.

(3) In the foregoing embodiment, there was disclosed an example in which the feeding side hose portion 56A extends through the space S between the upper link 21 and the lower link 22. Instead, the returning side hose portion 56B may extend through the space S.

(4) In the foregoing embodiment, there was disclosed an example in which under an empty state of the vehicle, the pivot (lower connection axis P4) of the lower link 22 relative to the wheel support member 11 is located downwardly of the pivot (lower pivot P3) of the lower link 22 relative to the link support portion 23. However, the invention is not limited thereto. For instance, the pivot of the lower link 22 relative to the wheel support member 11 may be located upwardly of the pivot of the lower link 22 relative to the link support portion 23, or the pivot of the lower link 22 relative to the wheel support member 11 may be located at the same height as the pivot of the lower link 22 relative to the link support portion 23.

Second Embodiment

Next, a second embodiment of the present invention will be explained with reference to the accompanying drawings.

Incidentally, in the following explanation, the front/rear direction and the left/right direction will be described as follows, unless indicated explicitly otherwise. Namely, in a utility vehicle as an example of a work vehicle to which the present invention is applied, the forward traveling side (see arrow F in FIGS. 7, 8) at the time of work traveling of the traveling machine body is defined as the "front", the reverse traveling side (see arrow B in FIGS. 7, 8) is defined as the "rear", the direction corresponding to the right side (see arrow R in FIG. 8) relative to the forward oriented posture in the font/rear direction is defined as "right" and the direction corresponding to the left side (see arrow L in FIG. 8) is defined as the "left", respectively.

General Configuration

Figure 7:
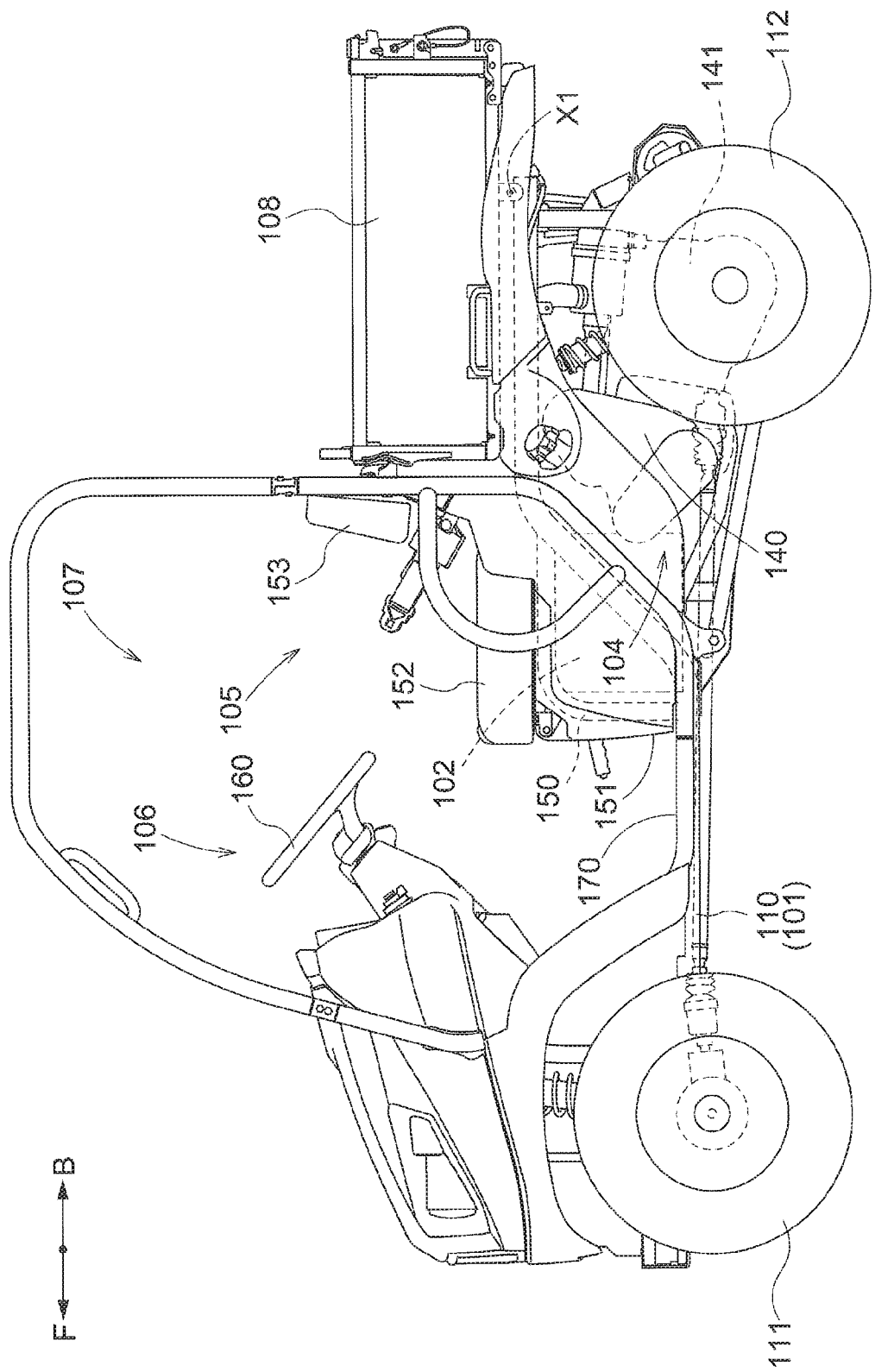
FIG. 7 is a view showing a second embodiment (same is true with the drawings up to FIG. 16), which is a left side view showing a utility vehicle.
Figure 8:
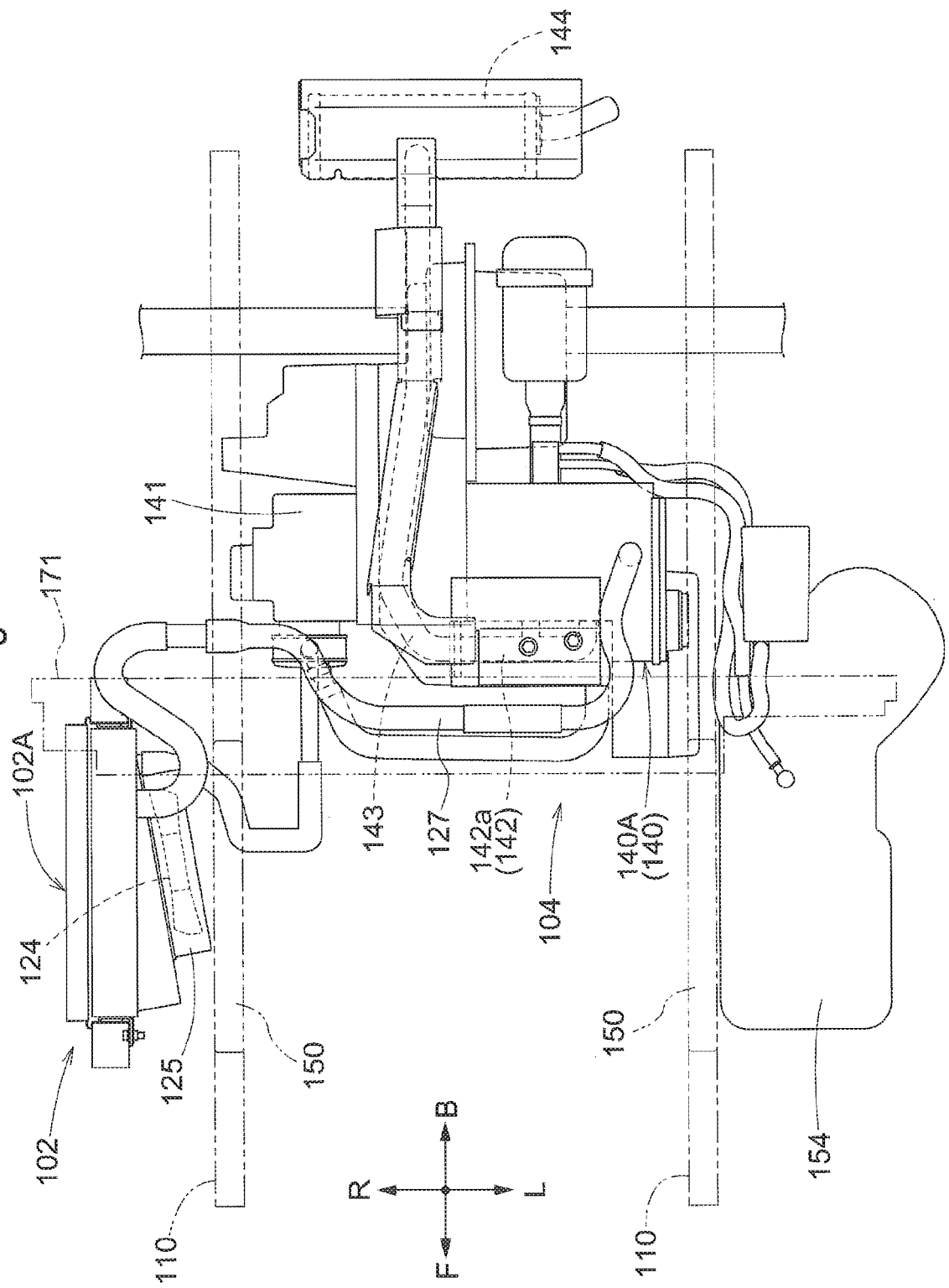
FIG. 8 is a plan view showing the utility vehicle.
Figure 9:
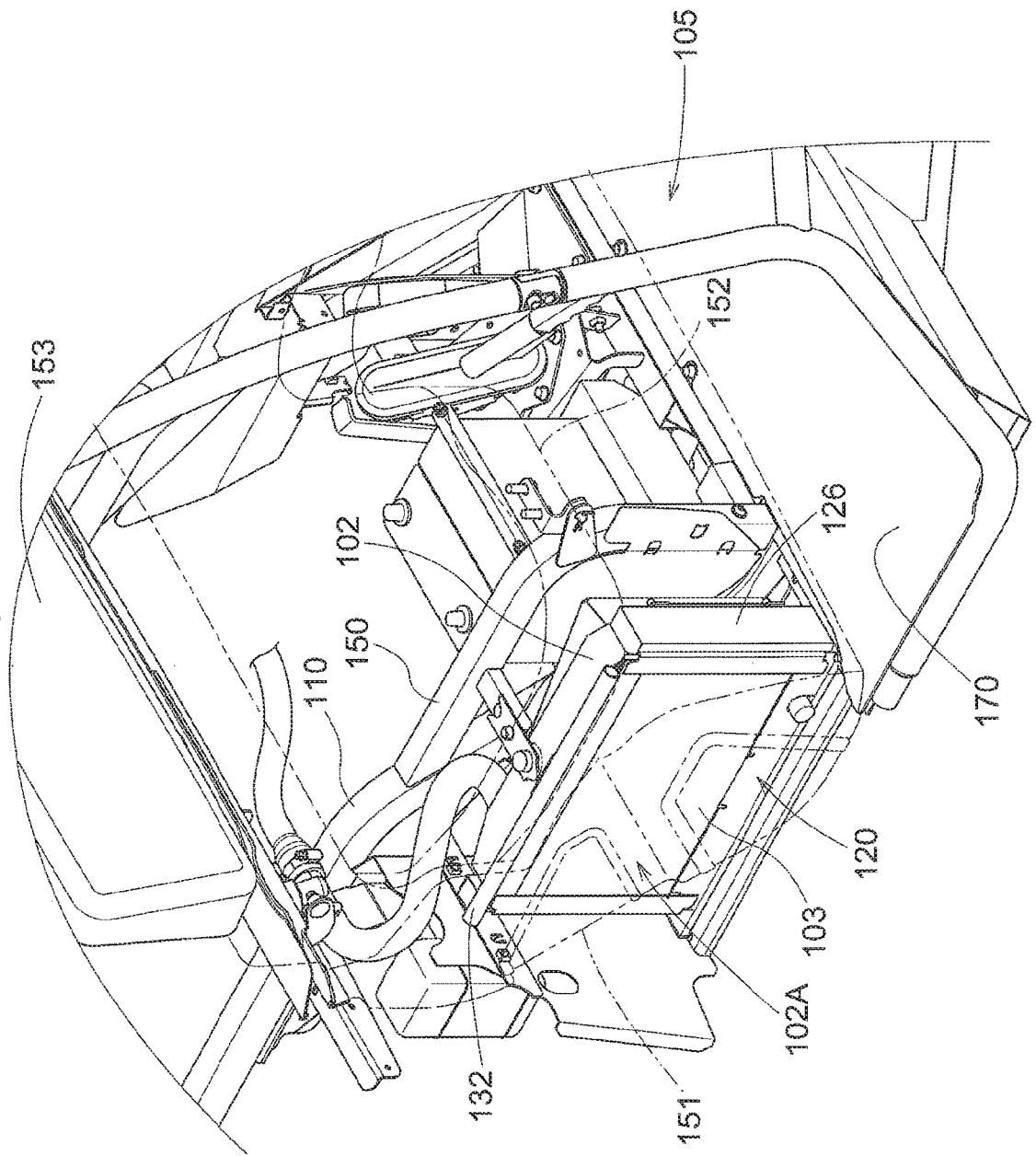
FIG. 9 is a perspective view showing a driving section and a prime mover section.

As shown in FIGS. 7 through 9, front wheels 111 constituted of a pair of left and right steerable tire wheels and rear wheels 112 constituted of a pair of left and right tire wheels are disposed in distribution on the front and rear sides of a vehicle body frame 101. Between the front wheels 111 and the rear wheels 112, there are provided a prime mover section 104 for driving the front wheels 111 and the rear wheels 112, and a driving section 107 having a driver's seat 105 and a maneuvering section 106. At a rear portion of the vehicle body frame 101, a load carrying deck 108 is mounted to be vertically pivotable about a laterally oriented horizontal direction axis X1 positioned at the vehicle body rear portion. A utility vehicle having these components, namely, the vehicle body frame 101, the front wheels 111 and the rear wheels 112, the prime mover section 104, the driving section 107 and the load carrying deck 108 constitutes a "work vehicle".

The vehicle body frame 101, as shown in FIG. 8, includes main frames 110 comprised of a pair of left and right angular pipe members as principal components and formed longitudinal in the front/rear direction, seat support frames 150 mounted on the left and right main frames 110, a driving section floor 170 in the form of a flat plate, etc.

Arrangement of Driving Section

In the driving section 107, the driving section floor 170 is provided on the left and right main frames 110 and at a front portion thereof, there is disposed the maneuvering section 106 having a steering wheel 160 and at a rear portion thereof, the driver's seat 105 is disposed.

The driver's seat 105 includes a hip seat 152 and a backrest seat 153, and there is provided a seat support frame 150 mounted erect on the left and right main frames 110. And, a shielding wall 151 is provided to extend between the front face and the upper face of the seat support frame 150.

And, to an upper side of the upwardly oriented face portion of the shielding wall 151, the hip seat 152 is disposed and at a rear portion thereof, the backrest seat 153 is fixed.

Figure 10:
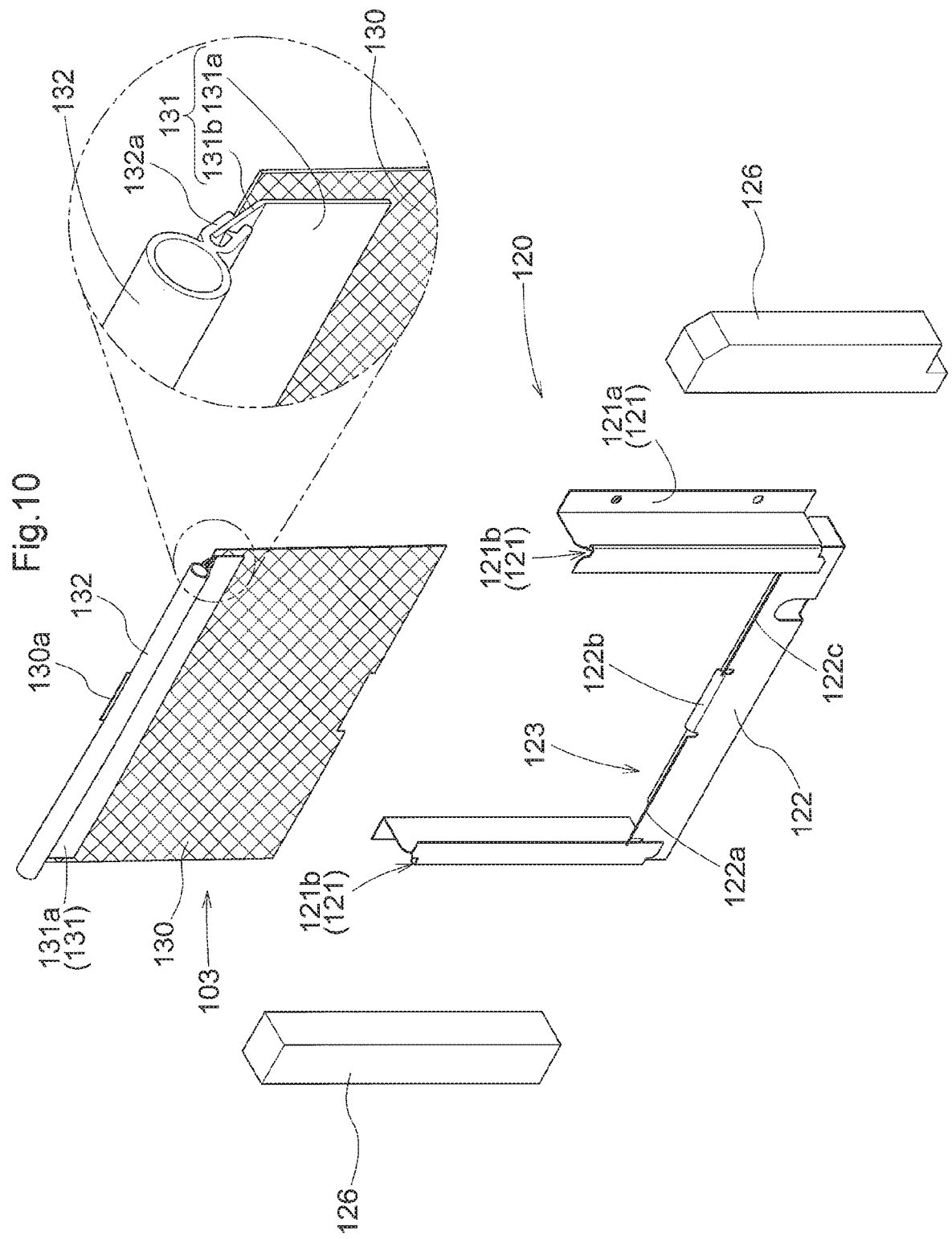
FIG. 10 is an exploded perspective view showing a radiator portion.

As shown in FIG. 7, FIG. 8 and FIG. 10, in the space downwardly of the seat support frame 150 of the driver's seat 105 and at a position adjacent the right lateral side, a radiator 102 is disposed to enter the space beneath the seat support frame 150. In the space downwardly of the seat support frame 150 and at a position adjacent the left lateral side, a fuel tank 154 is disposed. And, an arrangement is provided that in association with a drawing function of a radiator fan 124 (corresponding to the "cooling fan") disposed on the rear face side (machine body inner side) of the radiator 102, an ambient air can be introduced from the under side of the seat support frame 150.

Arrangement of Prime Mover Section

The prime mover section 104 is provided rearwardly and downwardly of the driver's seat 105. In this prime mover section 104, a water cooled engine 140 and a transmission case 141 are disposed in distribution on the left and right sides. Therefore, in comparison with a case of disposing these on the front and right sides, the front/rear length of the prime mover section 104 is reduced. An output from the transmission case 141 is transmitted to the left and right rear wheels 112 and the left and right front wheels 111.

In the prime mover section 104, the water-cooled engine 140 and the transmission case 141 are disposed side by side on the left and right sides, with the water-cooled engine 140 being disposed on the left side under a laterally (transversely) oriented posture along the machine body left/right direction and with the transmission case 141 being disposed on the right side. And, these components, namely, the water-cooled engine 140 and the transmission case 141, are disposed, as seen in the plan view, within the left/right spacing width of the fuel tank 154 and the radiator 102 and on the rear side of the machine body.

Namely, as shown in FIG. 8, the engine 140 and the transmission case 141 are disposed with positional displacements both in the front/rear direction and the left/right direction as seen in the plan view, relative to the fuel tank 154 and the radiator 102, thus being designed to reduce the front/rear size of the prime mover section 104 as a whole.

The engine 140 is provided with an exhaust manifold 142 adjacent the lateral sides of portions corresponding to respective cylinders (not shown) on the upper front side of an engine body 140A.

This exhaust manifold 142 includes a single cylindrical manifold portion 142a having a plurality of exhaust pipes (not shown) connected to the respective cylinders inside the engine body 140A. The cylindrical manifold portion 142a is disposed under a laterally oriented posture having its cylinder axis direction aligned with the horizontal direction and is provided to protrude from the lateral side of the engine body 140A, at apposition adjacent the upper portion of the engine body 140A.

To the manifold portion 142a, there is continuously provided an exhaust duct 143 for guiding exhaust gas toward the muffler 144.

Arrangement Around Radiator

As shown in FIGS. 9 through 12, the radiator 102 is fixed on the vehicle body frame 101 via a fixation frame 120. The fixation frame 120 includes vertical frame portions 121 opposed to opposed end portions in the horizontal direction of the outer circumferential portion of the radiator 102 and a lower frame portion 122 interconnecting lower end portions of the vertical frame portion 121 at the respective end portions.

Figure 12:
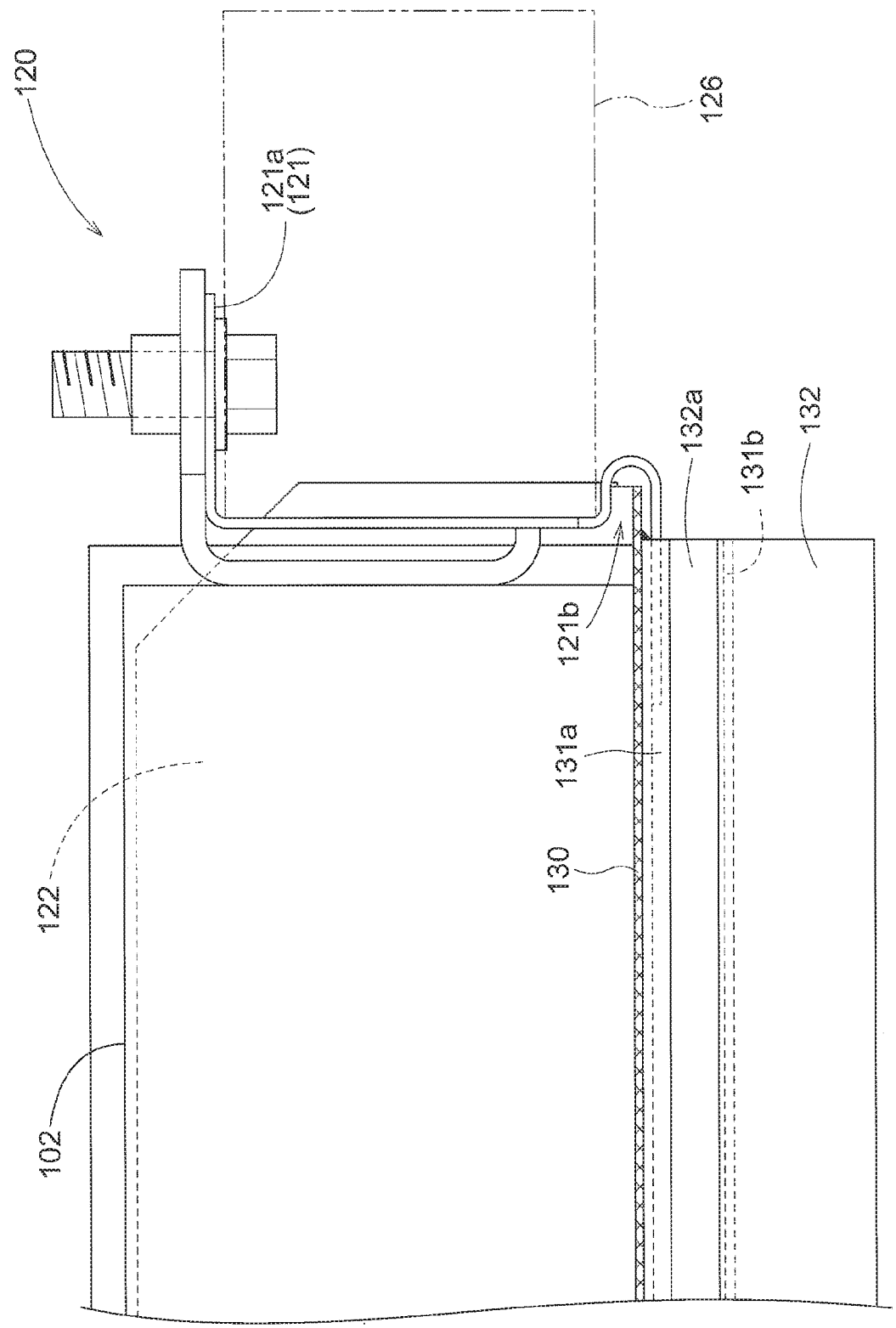
FIG. 12 is an enlarged plan view showing the fixation frame and the dustproof mesh.

Each one of the vertical frame portions 121, 121 spaced apart from each other in the front/rear includes, as shown in FIG. 12, a connection piece portion 121a bolt-connectable to a fan case 125 surrounding the radiator 102 and a radiator fan 124, and a guide rail portion 121b guiding a dustproof mesh 103 to be described later, with allowing its slidable movement. In each vertical frame portion 121, 121, on the side opposite to the side facing the outer circumferential face of the radiator 102 and located between the connection piece portion 121a and the guide rail portion 121b, there is mounted a shielding member 126 which protrudes laterally outwards in the front/rear direction.

The shielding member 126 is formed of an elastically deformable material such as sponge. As this shielding member 126 is placed in abutment against the front face of a partition wall 155 provided on the rear side of the radiator 102 and a rear face of an upwardly oriented face portion of the shielding wall 151 positioned on the front side of the radiator 102, gaps present between the radiator 102 and the partition wall 155 and between the radiator 102 and the upwardly oriented face portion of the shielding wall 151 are shielded.

The guide rail portion 121b, as shown in FIG. 12, is formed by bending a part of the vertical frame portion 121 formed of sheet metal into U-shape.

This U-shaped guide rail portion 121a has its position to be attached to the radiator 102 fixed by bolt-connecting the connection piece portion 121a to the radiator 102 and the fan case 125. This attachment position is set such that of the outer circumferential edge of the dustproof mesh 103 provided to be opposed to an air intake face 102A of the radiator 102, the outer circumferential edge portions of the opposed end portions spaced apart from each other on the front and rear sides in the horizontal direction may enter therein and is formed along the extending direction of the air intake face 102A of the radiator 102.

Therefore, with the opposed end portions spaced apart from each other before and after the dustproof mesh 103 being fitted in the guide rail portion 121b, it is possible to slidably guide the dustproof mesh 103 in the vertical direction.

The lower frame portion 122 interconnecting the lower end portions of the vertical frame portions 121 is a portion formed of sheet metal having an approximately L-shaped cross section as seen in a side view. In this lower frame portion 122, at an upper end portion thereof, there are provided retention piece portions 122a, 122b, 122c as three parts divided along the air intake face 102A of the radiator 102.

Of the retention piece portions 122a, 122b, 122c, the retention piece portion 122b at the center position is bent towards the rear face side of the air intake face 102A, whereas the retention piece portions 122a, 122c on the opposed end sides are bent toward the direction away from the air intake face 102A to the laterally outer side. These retention piece portions, i.e. the retention piece portion 122b at the center position and the retention piece portions 122a, 122c on the opposed end sides, together constitute an upwardly flared receiving stopping portion 123 having V-shape as seen in the side view.

Therefore, with insertion of the dustproof mesh 103 from the upper side to the lower side as being guided by the guide rail portion 121b, the lower end of the dustproof mesh 103 will come into contact with the receiving stopping portion 123 constituted of the retention piece portion 122b at the center position and the retention piece portions 122a, 122c on the opposed end sides. This position received and stopped by the retention piece portions 122a, 122b, 122c is the lowering limit of the dustproof mesh 103 and the condition of the dustproof mesh 103 being fixed in position at the lower limit position.

Dustproof Mesh

The dustproof mesh 103, as shown in FIG. 9 and FIG. 10, includes a mesh body 130 attachable to the position opposed to the air intake face 102A of the radiator 102 and formed of a metal mesh member in the form of a flat plate to allow air communication, and a support plate 131 fixedly welded to an upper portion of this mesh body 130. This support plate 131 has a horizontal width extending along the entire upper side portion of the mesh body 130 and provides also a function of reinforcing the upper portion of the mesh body 130.

The support plate 131 includes a lower face 131a along the plate face of the mesh body 130 and an upper face 131b bent slightly toward the side away from the air intake face 102A of the radiator 102. The lower face 131a is fixedly welded to the mesh body 130 and the upper face 131b has its upper side tilted to be progressively away from the mesh body 130. To this upper face 131b, a fitting portion 132a of a hollow cylindrical trim 132 is fitted.

Figure 11:
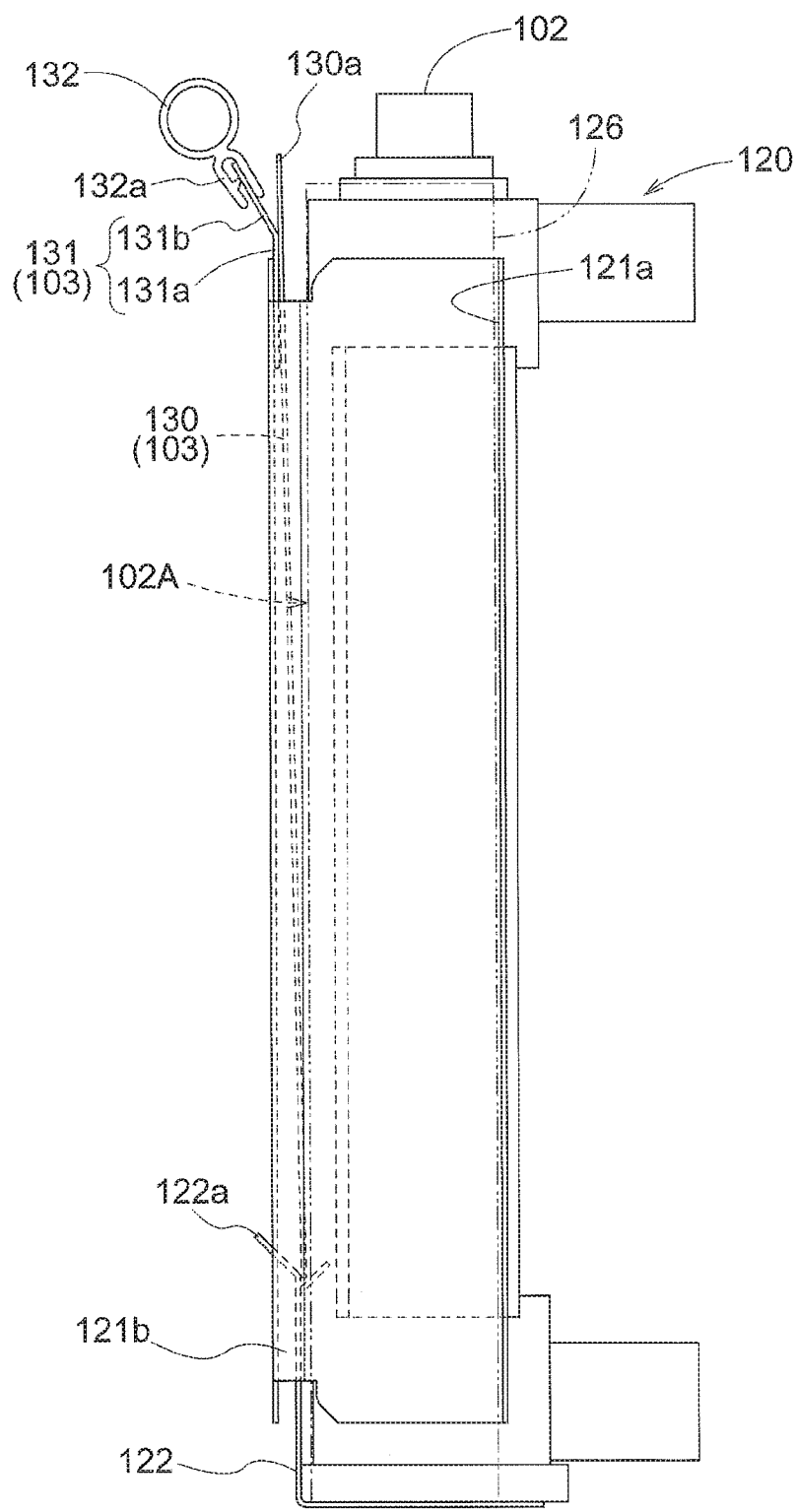
FIG. 11 is a side view showing a fixation frame and a portion of a dustproof mesh.

As shown in FIG. 10 and FIG. 11, in the mesh body 130, on the side upwardly of its portion to which the support plate 131 is fixedly welded, there is provided an upper extension portion 130a extended upwards in flush with the plate face on more lower side than the portion to which the support plate 131 is fixedly welded. This upper extension portion 130a exists at the center portion excluding the end portions in the direction along the plate face of the mesh body 130. With this arrangement of the upper extension portion 130a protruding upwards at the center portion, when the dustproof mesh 103 is to be inserted to the guide rail portion 121b, the upper extension portion 130a can be used as an "aid". Namely, since the upper end portion of the support plate 131 provided with the trim 132 is significantly off the extension line of the plate face of the mesh body 130, even when the trim 132 is pressed down with gripping thereof, it is difficult for this pressing-down force to be transmitted in the direction parallel with the plate face of the mesh body 130. However, when the upper extension portion 130a is pressed down, the pressing-down force in the direction parallel to the plate face of the mesh body 130 can be transmitted.

As described above, by attaching the trim 132 to the upper portion of the dustproof mesh 103, the dustproof mesh 103 can be utilized as an attachment member for the trim 132.

And, as the hollow cylindrical trim 132 is attached to the upper portion of the dustproof mesh 103, this trim 132 can be utilized as a grip portion for gripping the upper portion of the dustproof mesh 103 from its upper side, so that insertion operation and withdrawal operation of the dustproof mesh 103 to/from the guide rail portion 121b at the time of maintenance can be carried out easily.

Piping Support Tool

Figure 13:
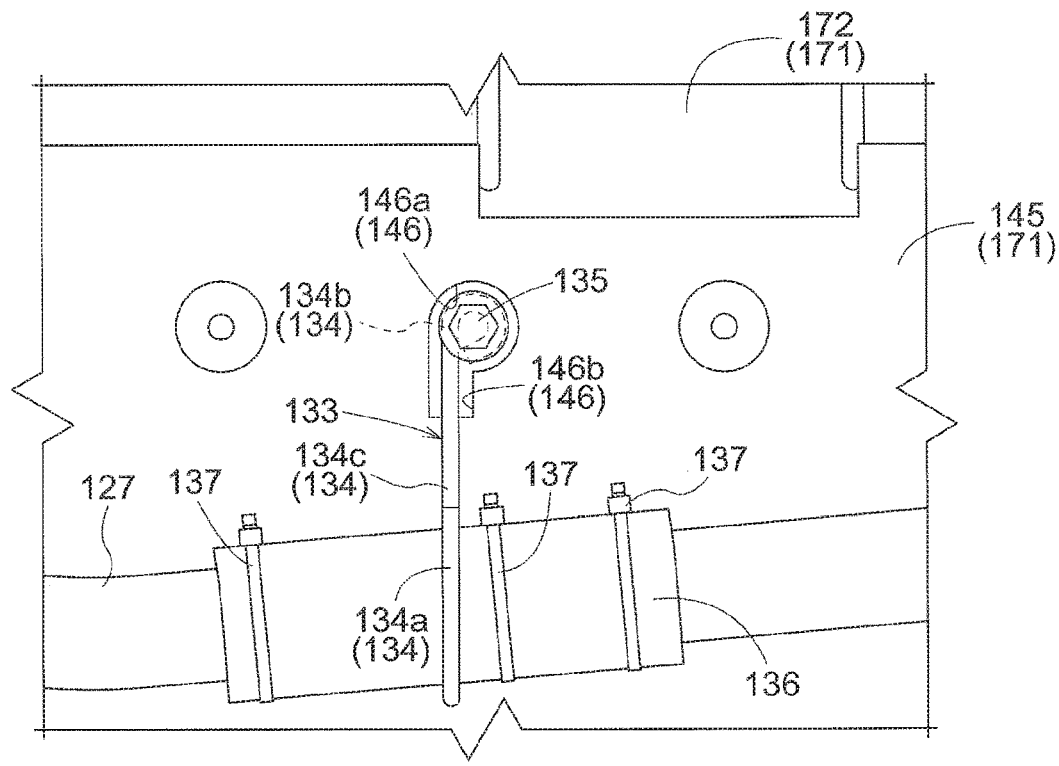
FIG. 13 is a front view showing a piping support tool.
Figure 14:
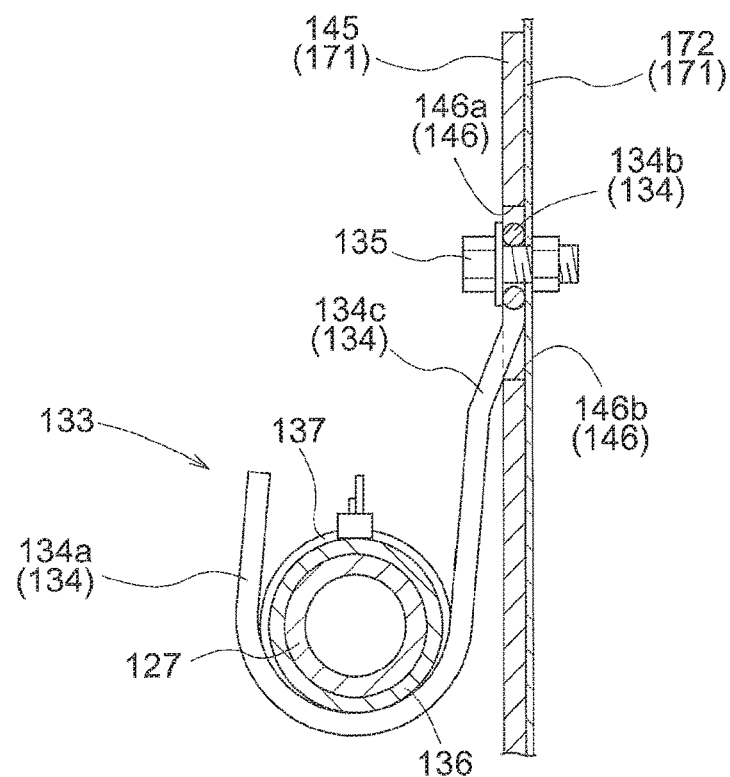
FIG. 14 is a section view showing the piping support tool.

As shown in FIG. 9, FIG. 13 and FIG. 14, at the back portion of the backrest seat 153 of the driver's seat 105, there is provided a partition wall 171 for partitioning between the prime mover section 104 and the driving section 107. The partition wall 171 includes a rear wall 172 that supports the backrest seat 153 and a heat shielding plate 145 provided as being affixed to the rear side face of the rear wall 172.

The heat shielding plate 145 is provided for blocking transmission of radiant heat from the prime mover section 104 side to the driving section 107 side and partitions between the prime mover section 104 and the space beneath the driver's seat 105.

In the partition wall 171, on its rear side facing the prime mover section 104, there is provided a piping support tool 133 which is caused to support a water hose 127 or the like for feeding/discharging cooling water to/from the radiator 102.

The piping support tool 133, as shown in FIG. 13 and FIG. 14, includes a hose guide rod 134 having a hook portion 134a formed by bending a lower side of a bar-like member into a hook shape and a hole portion 134b formed by bending the upper end portion of the bar-like member to allow insertion of a bolt. Andy, by using the piping support tool 133 constituted of this hose guide rod 134 and a connection bolt 135 that can be inserted into the hole portion 134b of the hose guide rod 134, the water hose 127 is fixed to the partition wall 171.

In the partition wall 171 and on the rear side of the rear wall 172, the heat shielding plate 145 positioned to face the prime mover section 104 defines a keyhole-like retention hole 146. This retention hole 146 includes a round hole portion 146a allowing inserting of the portion of the hose guide rod 134 where the hole portion 134b is present and a rectangular hole portion 146b capable of clamping a straight rod portion 134c positioned between the hole portion 134b and the hook portion 134a.

Therefore, when the connection bolt 135 is inserted into the hole portion 134b and bolt-connected to the rear wall 172, the straight rod portion 134c of the hose guide rod 134 is positioned within the keyhole-like retention hole 146 and clamped by the retention hole 146 from the opposed sides. With this, the hose guide rod 134 supports the water hose 127 under a suspended state and supports it also with restricting displacement of this water hose 127 in the length direction thereof.

On the outer circumference of the water hose 127, a cover sheet 136 is wound, and also a stopper tool 137 is provided for maintaining the cover sheet 136 under such wound and wrapping state. The hose guide rod 134 of the piping support tool 133 surrounds the cover sheet 136 from the outer side in such a manner as to support the water hose 127 together with the cover sheet 136.

Figure 15:
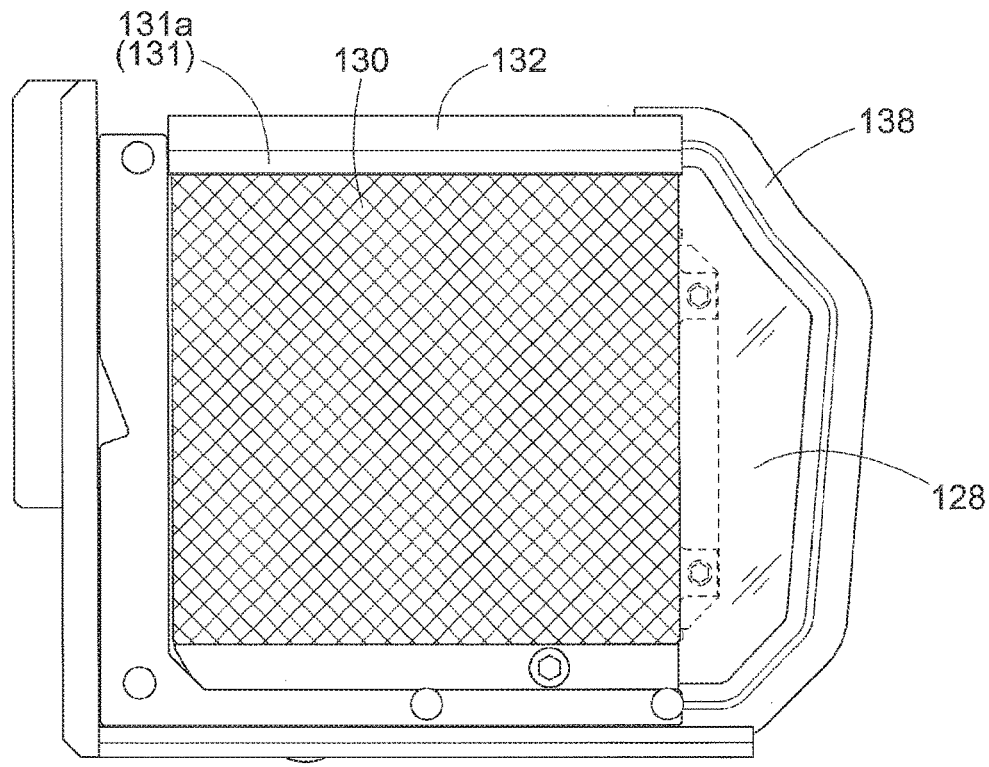
FIG. 15 is a front view showing a radiator portion in a further embodiment.

Modified Embodiments of Second Embodiment (1) In the foregoing embodiment, there was disclosed an example of an arrangement in which at the end portions in the left/right direction of the radiator, the trim 132 is not provided, and to the lateral outer side of the vertical frame portion 121, the shielding member 126 formed of sponge or the like is directly attached. However, the invention is not necessarily limited thereto. For instance, as shown in FIG. 15, on the lateral outer side of the vertical frame portion 121, a plate-like charging material 128 having an appropriate shape may be provided and on the lateral outer side of this plate-like charging material 128, a different trim 138 may be provided.

The rest of the above arrangement may be same as the foregoing embodiment.

(2) In the foregoing embodiment, there was disclosed an example of an arrangement in which as the dustproof mesh 103, the further support plate 131 is fixedly welded to the upper portion of the mesh body 130 and the trim 132 is attached to this support plate 131. However, the invention is not necessarily limited thereto. For instance, without using the support plate 131, the trim 132 may be directly attached to the upper portion of the mesh body 130. In this case, the mesh body 130 as a whole can be formed like a flat plate. Like the case of using the support plate 131, the upper portion may be bent toward the side away from the radiator 102.

The rest of the above arrangement may be same as the foregoing embodiment.

(3) In the foregoing embodiment, there was disclosed an example of an arrangement in which the trim 132 is provided for the dustproof mesh 103 provided for the air intake face 102a of the radiator 102 disposed in the space beneath the driver's seat 105. However, the invention is not necessarily limited thereto. For instance, as the dustproof mesh 103 to which the trim 132 is to be attached, this may of course be one provided for the air intake face 102A of the radiator 102 disposed inside the hood at the machine body front portion.

The rest of the above arrangement may be same as the foregoing embodiment.

Figure 16:
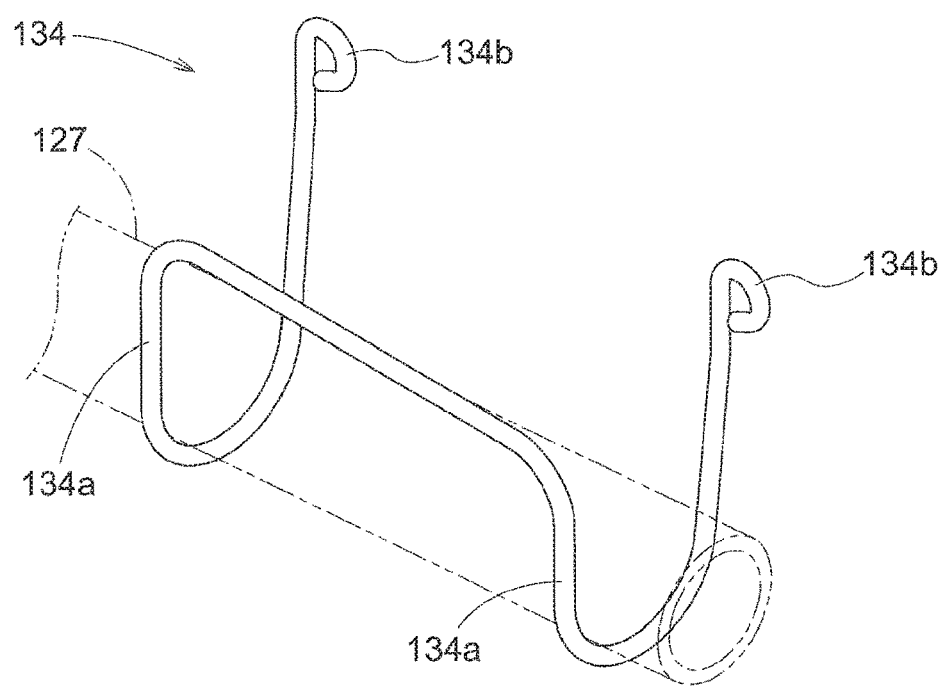
FIG. 16 is a perspective view showing a piping support tool in a further embodiment.

(4) In the foregoing embodiment, there was disclosed an example of an arrangement in which as the piping support tool 133, there is employed the hose guide rod 134 having the hook portion 134a at one portion and having also the hole portion 134b at one portion. However, the invention is not necessarily limited thereto. For instance, as shown in FIG. 16, it is possible to employ a hose guide rod 134 having hook portions 134a provided at a plurality of portions thereof and having the hole portions 134b provided at a plurality of portions thereof.

In this case, as the retention hole 146 to be provided in the heat shielding plate 145, round hole portions 146a in the form of simple round holes rather than the key-hole shape may be provided at a plurality of portions in correspondence with the hole portions 134b of the hose guide rod 134.

The rest of the above arrangement may be same as the foregoing embodiment.

The present invention is applicable not only to a multi-purpose work vehicle, but also to various kinds of work vehicles such as a rice planting machine, a tractor, etc.

Also, the present invention is applicable not only to a utility vehicle, but also to various kinds of work vehicles such as a grass cutting machine, a transporter vehicle, an agricultural work machine, etc.

DESCRIPTION OF SIGNS

First Embodiment

8: engine
11: wheel support member
20: link mechanism
21: upper link
22: lower link
23: link support portion
53: radiator
56: cooling water circulation hose
56A: hose portion
P3: pivot (lower pivot axis)
P4: pivot (lower connection axis)
S: space Second Embodiment 101: vehicle body frame
102: radiator
102A: air intake face
103: dustproof mesh
120: fixation frame
120b: guide rail portion
124: cooling fan
132: trim

The invention claimed is:
1. A work vehicle comprising:
a pair of left and right link mechanisms disposed between a vehicle body and a wheel support member and configured to support the wheel support member to the vehicle body to be vertically pivotable;
a suspension mechanism disposed between the vehicle body and the wheel support member and configured to elastically support the wheel support member;
an engine disposed between the pair of left and right link mechanisms;
each one of the pair of left and right link mechanisms including an upper link provided between a link support portion formed in the vehicle body and the wheel support member and a lower link provided between the link support portion and the wheel support member;
a radiator disposed on lateral outer side of the vehicle body relative to the link mechanisms;
a cooling water circulation hose connected to the engine and the radiator and configured to circulate engine cooling water between the engine and the radiator;
the link support portion having a recess portion opened to the a between the upper link and the lower link; and the cooling water circulation hose being provided to enter the recess portion to extend through the space in a vehicle body inner/outer direction.

2. The work vehicle of claim 1, wherein of the cooling water circulation hose, a hose portion thereof used for feeding cooling water from the radiator to the engine enters the recess portion to extend through the space in the vehicle body inner/outer direction.

3. The work vehicle of claim 1, wherein the radiator is provided on a lateral side of the link support portion.

4. The work vehicle of claim 1, wherein the engine is supported to the wheel support member.

5. The work vehicle of claim 4, wherein under an empty condition of the vehicle body, a pivot of the lower link relative to the wheel support member is located more downward than a pivot of the lower link relative to the link support portion.

* * * * *

UNITED STATES PATENT AND TRADEMARK OFFICE
CERTIFICATE OF CORRECTION

PATENT NO. : 11,230,184 B2
APPLICATION NO. : 16/708840
DATED : January 25, 2022
INVENTOR(S) : Tatsuya Nagatomi et al.

Page 1 of 1

It is certified that error appears in the above-identified patent and that said Letters Patent is hereby corrected as shown below:

In the Claims

Column 16, Line 67, Claim 1, delete "the a" and insert -- a space --

Signed and Sealed this
Twenty-sixth Day of July, 2022

Katherine Kelly Vidal
*Director of the United States Patent and Trademark Office*